Patented Dec. 5, 1922.

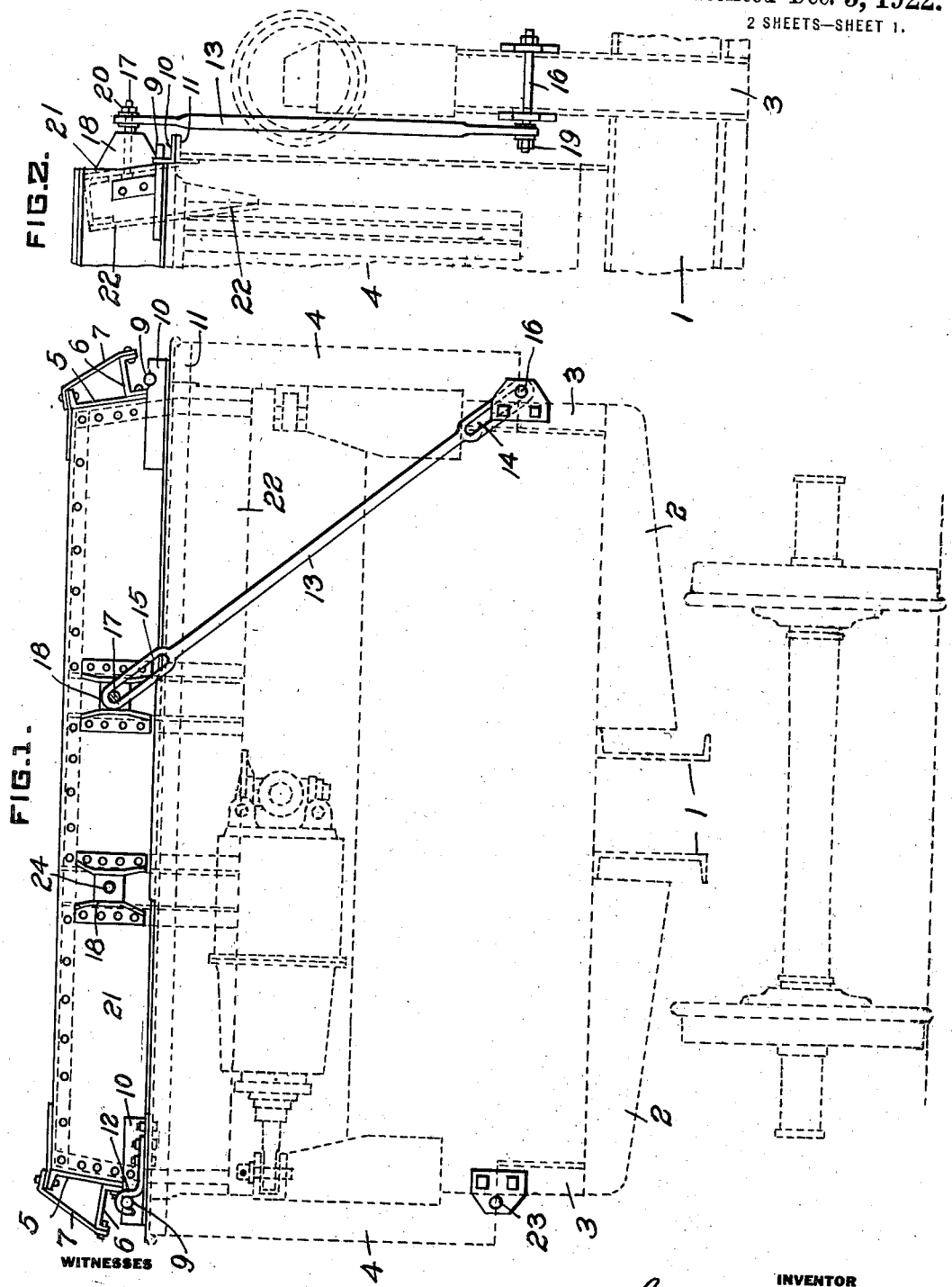

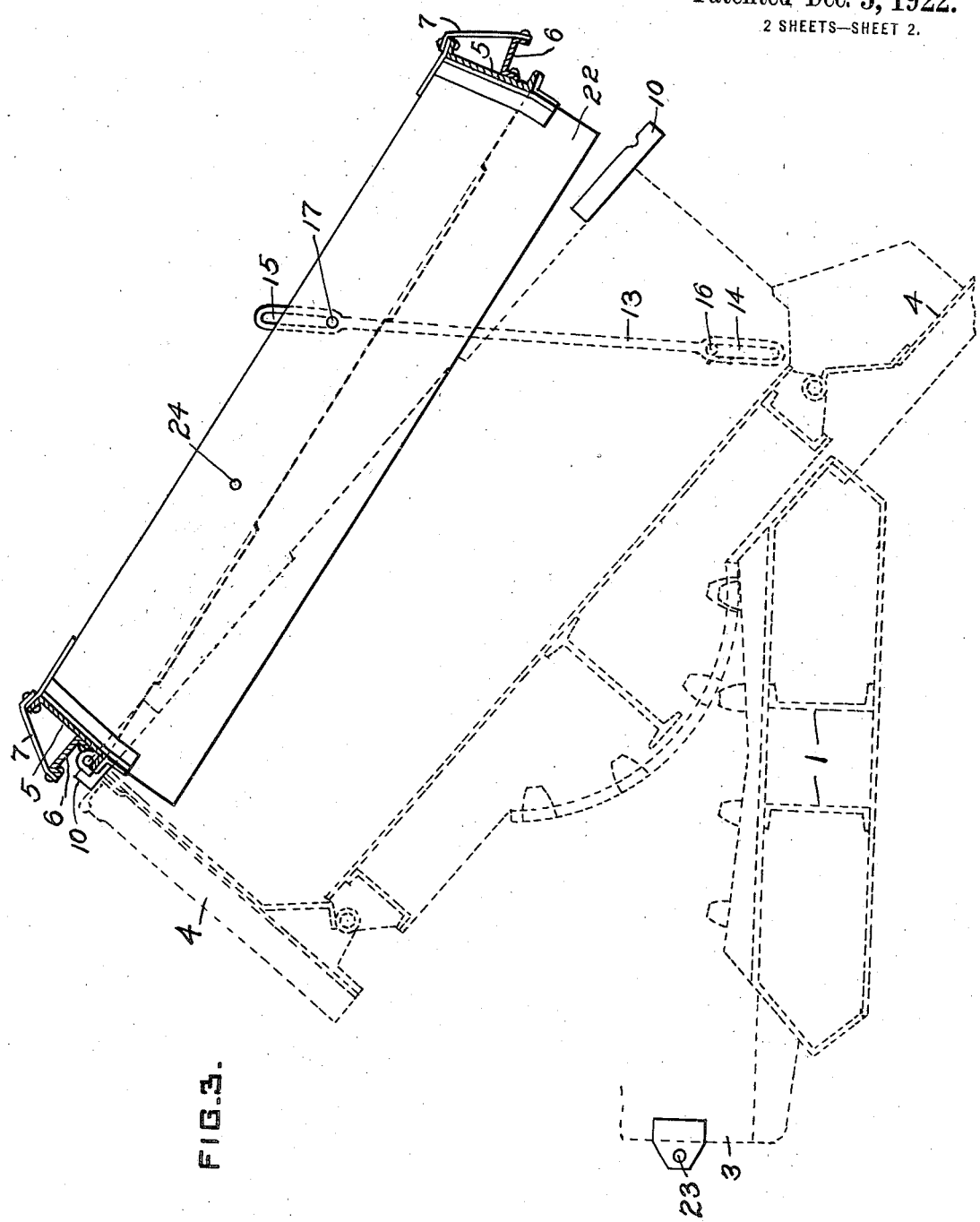

1,437,745

UNITED STATES PATENT OFFICE.

CHARLES H. CLARK, OF LIBRARY, PENNSYLVANIA, ASSIGNOR TO CLARK CAR COMPANY, A CORPORATION OF NEW JERSEY.

DUMPING CAR.

Application filed December 17, 1919. Serial No. 345,447.

*To all whom it may concern:*

Be it known that I, CHARLES H. CLARK, a citizen of the United States, and a resident of Library, in the county of Allegheny and State of Pennsylvania, have invented a new and useful Improvement in Dumping Cars, of which the following is a specification.

My invention relates to railroad rolling stock and consists in an improvement in dumping cars. In one of the familiar types of dumping cars, a gondola body is so mounted upon the car underframe that it may be tilted thereon with the floor sloping to either side of the track desired. The car sides are formed of doors hinged along the edge of the car floor and when the body is tilted, the doors on the side nearest the ground open until they form an extension of the car floor and over which the load is discharged to that side of the track. The body is ordinarily self-righting after the load is dumped.

The object of my invention is to provide such a dump car with a vertical extension of the sides and ends for the purpose of increasing the capacity of the car and to provide means for preventing the extension from interfering with the dumping of the load and with self-righting of the tilted body.

In the accompanying drawings, Figure 1 is an end elevation of a car of the type I have described, with my improvement applied; Fig. 2 is an elevation of one corner of the car looking towards the dumping side, and Fig. 3 is a transverse, vertical section thru the car when it is in dumping position.

Mounted on the usual trucks is a car underframe having centers sills 1, ends sills 2 and corner posts 3. The latter consist of channels facing outwardly at the sides of the car end and mounted on the end sills 2. Doors 4 comprise the sides of the car and each door is hinged and adapted to turn on its hinges to form an extension of the car floor for dumping purposes as shown on the right hand side of Fig. 3.

Those familiar with the art are acquainted with various means for tilting the car body and opening the doors but such equipment forms no part of my present invention and I do not illustrate same.

The ends of the car body are fixed and support an extension for the ends and sides, which I term a "rack" and which gives the car additional capacity. The rack is a rigid, rectangular frame without top or bottom. Channels 5 form its sides and a stiffener member 6 extends longitudinally of each channel 5 with its web at right angles thereto and with its inner flange riveted to the web of channel 5. At intervals, struts or brackets 7 unite the outer flange of channels 6 and the upper flange of side 5. The ends of the rack consist of inverted U shaped steel structures having one leg 21 flanged to rest upon the car end and the other leg 22 extending downwardly to overlap the end of the car body. The sides and ends of the rack are rigidly connected and braced. The reinforced construction constitutes the rack a self supporting structure between its ends.

Each end of side channel 5 is provided with an extension member 9 which is journaled in a bearing angle 10 mounted on an angle end plate 11 of the car body. Each end of the car is equipped with one bearing clip 12 which may be bolted to either one of angles 10 and cooperate with that angle to form a hinge for the rack.

Each end of the car is provided with a rack raising strut 13. The ends of this strut are slotted at 14 and 15. A horizontal pin 16 is mounted on each body corner post 3 and is adapted to be inserted thru slot 14 of strut 13. Spaced trunnion brackets 18 are provided on each end of the rack and a pin 17 is adapted to be mounted in one bracket 18 and to be inserted thru slot 15 in strut 13. Nuts 19 and 20, respectively, with suitable washers, hold strut 13 in position on pins 16 and 17.

Strut 13 is of such length that the maximum distance between the opposite ends of slots 14 and 15 will accommodate the pins when the body and underframe have the relative positions shown in Fig. 1.

When the car is dumped, the car body is tilted to the right and pin 17 moves to the position shown in Fig. 3 which is nearer to pin 16 than its original position. During the first part of the tilting movement, strut 13 slides down pin 16 until the upper end of slot 14 engages the pin and pin 17 then slides down slot 15 until it reaches the lower end of the slot. Strut 13 prevents the entire rack from accompanying the body bodily during further tilting movement of the latter by swinging the side of the rack on the dumping side of the car from the body on hinge portions 9, 10 and 12.

Doors 4 on the dumping side begin to open with the tilting movement but strut 13 functions to raise the unhinged side of the rack from the car body only during the latter part of the movement. It will be understood that a corresponding strut is similarly connected at the opposite end of the car. When the car is in dumping position, leg 22 forms a shield at the car end to prevent material from overflowing the end.

If it is desired to dump the car in the opposite direction, nuts 19 and 20 are removed and strut 13 is shifted to pins 23 and 24 on the other side of the car and bearing clip 12 is unbolted from one bearing angle and shifted to the opposite one thus reversing the hinge position of the rack.

In a car of the tilting type illustrated, the return of the body to upright position is secured by the preponderance of weight on the non-dumping side after the load is dumped. The use of strut 13 provides means for increasing that preponderance during initial righting movement by supporting a very substantial part of the weight of the rack from the car underframe and by having that portion which is borne by the body supported on the side where the preponderance of weight must lie to right the body. So it will be noticed in Fig. 3 that all of the rack weight borne by the tilted body is supported at the rack hinge which is on the left or return side of the body support. While the dumping side resumes its share of the weight of the rack before the body is upright, the preponderance of the weight of the body and rack at the point of resumption is then on the left hand side of the body support due to the fact that the center of mass of the body and rack moves to the left more rapidly than the supporting point for the body rocker on the truck rocker stand. If strut 13 be omitted and the rack substantially supported in part at the dumping side of the body ends at all times, the location of the center of mass would move so far to the right of the supporting point, in dumping, as to impair the self-righting feature of the car.

I have shown two trunnion brackets 18, spaced from the center of the car body and, in the car illustrated, I prefer such construction, but the assembly could be modified to use only one such bracket and in that case, strut 13 need not be made removable from the rack. The matter of the rack sides and ends is also optional as is the supporting point for the lower end of strut 13. In all the details of my invention, modifications are easily made without departing from its principles.

I claim:—

1. In a railway car, an underframe, a gondola body, and a rectangular rack forming an extension for both sides and both ends of said body and hinged to said body.

2. In a railway dump car, an underframe, a gondola body provided with sides which open when the car is dumped, and an extension for the sides and ends of said body consisting of a rectangular frame supported on the ends of said body.

3. A rectangular extension for the sides and ends of a gondola car body, exclusively and pivotally supported upon the ends of said body.

4. In a car, a tilting, dumping body having upright sides and ends, extension members for each side and end of said body comprising a rigid rack for said body and means for moving said rack from said body when said body is being tilted to dumping position.

5. In a dump car in which a body having upright sides and ends is adapted to tilt to one side to dump its load, an extension for said sides and ends of said body consisting of a rectangular rack hinged to the non-dumping side of said body, and means for raising said rack from the dumping side of said body when said body is tilted to dumping position.

6. In a dump car, a tilting gondola body the sides of which consist of doors hinged near the body floor and which open on one side of the body when the body is tilted to dumping position, and a rack for said body adapted to extend upwardly from the tops of both of said sides when the latter are upright and closed, and adapted, when said body is tilted, to be raised from its normal position adjacent the opening door on the dumping side of said body.

7. In combination in a dump car, an underframe, a gondola body tiltingly mounted thereon and adapted to be tilted to one side of the car to dump the load and to right itself after the load is dumped, a rack mounted on upper edges of the body, forming an extension thereof, and normally supported thereby, and means for automatically relieving the downwardly moving side of the body of the support of said rack, as the body moves to a dumping position.

8. In a car, a tilting, dumping body, a vertical extension for both sides of said body comprising a rectangular rack for said body hinged at one side and means for moving the opposite side of said rack from the adjacent side of said body during a portion only of the tilting movement of said body.

9. In a car, an underframe, a gondola body adapted to tilt to one side of the car to dump its load, a rectangular rack, comprising an extension for each body side and end, a strut member secured to said underframe and to said rack and adapted to permit said rack to move with said body during a portion of the latter's tilting movement and to prevent the side of said rack adjacent the dumping side of said body from moving with said body during the remainder of the latter's tilting movement.

10. In a car, an underframe, a tilting, dumping gondola body, a rack comprising rigidly connected extensions for the sides and ends of said body mounted on said body, a horizontal pin on said underframe, a horizontal pin on said rack, a strut provided at its ends with slots adapted, respectively, to engage said pins to permit the approach of said pins towards each other during the initial dumping movement of said body and then to prevent further approach of said pins towards each other, thereby limiting the approach of said rack towards said underframe.

11. In a car, a gondola body adapted to be tilted to one side of the car to dump its load and adapted to return itself to upright position when its load is dumped, a rectangular rack forming an extension for both sides and both ends of said body and normally supported on each side of the body, and means for automatically relieving the dumping side of said body from the support of said rack.

12. In combination in a dump car, an underframe, a body tiltingly mounted thereon, a rack for increasing the capacity of the body mounted on the body, means for tilting the body, and independent means between the underframe and the body for relieving the downwardly moving side of the body of the weight of said rack after the body has started to move to a dumping position.

13. In combination in a dump car, an underframe, a body tiltingly mounted thereon, a rack mounted so that the weight thereof is substantially uniformly distributed with relation to the tilting axis of the body when the body is in an upright position, means for tilting the body to a dumping position, and a strut between said rack and said underframe for raising the rack from the downwardly moving side of the body after the body has started to move to a dumping position and for shifting the weight of the rack transmitted to the body to the non-dumping edge of the body.

In testimony whereof, I have hereunto subscribed my name, this 5 day of December, 1919.

CHARLES H. CLARK.